(12) United States Patent
Chatten et al.

(10) Patent No.: US 10,562,539 B2
(45) Date of Patent: Feb. 18, 2020

(54) SYSTEMS AND METHODS FOR CONTROL OF VEHICLE FUNCTIONS VIA DRIVER AND PASSENGER HUDS

(71) Applicant: Ford Global Technologies, LLC, Dearborn, MI (US)

(72) Inventors: Alyssa Chatten, Royal Oak, MI (US); Vivekanandh Elangovan, Canton, MI (US); John Robert Van Wiemeersch, Novi, MI (US); Ali Hassani, Ann Arbor, MI (US); Laura Viviana Hazebrouck, Birmingham, MI (US); Thomas Joseph Hermann, Troy, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 16/031,987

(22) Filed: Jul. 10, 2018

(65) Prior Publication Data

US 2020/0017122 A1  Jan. 16, 2020

(51) Int. Cl.
*B60W 50/12* (2012.01)
*G01C 21/36* (2006.01)
(Continued)

(52) U.S. Cl.
CPC ............ *B60W 50/12* (2013.01); *B60K 35/00* (2013.01); *G01C 21/365* (2013.01); *G02B 27/01* (2013.01);
(Continued)

(58) Field of Classification Search
None
See application file for complete search history.

(56) References Cited

U.S. PATENT DOCUMENTS 4,176,250 A * 11/1979 Berglind ................ B60K 37/06
701/1
5,973,619 A   10/1999 Paredes
(Continued)

FOREIGN PATENT DOCUMENTS

CA      2324647 A1    3/2002
CN    102262720 A    11/2011
(Continued)

OTHER PUBLICATIONS

Ilse Jurrien, *LG Flexible Head-Up Display With Augmented Reality Capabilities*, Dec. 2017, 13 pages.

*Primary Examiner* — Genna M Mott
*Assistant Examiner* — Melanie J Patrick
(74) *Attorney, Agent, or Firm* — Frank Lollo; Eversheds Sutherland (US) LLP (57) ABSTRACT

Method and apparatus are disclosed for transferring control of one or more vehicle functions from a driver HUD to a passenger HUD. An example vehicle includes a driver HUD, a passenger HUD, and a processor. The processor is configured for enabling control of one or more vehicle functions via the driver HUD responsive to determining that the vehicle speed is below a threshold. The processor is also configured for transitioning control of the one or more vehicle functions from the driver HUD to the passenger HUD responsive to determining that the vehicle speed has increased above the threshold.

18 Claims, 3 Drawing Sheets

(51) Int. Cl.
*G02B 27/01* (2006.01)
*B60K 35/00* (2006.01)

(52) U.S. Cl.
CPC .. *B60K 2370/736* (2019.05); *B60K 2370/739* (2019.05); *B60W 2520/10* (2013.01)

(56) References Cited

U.S. PATENT DOCUMENTS

| | | | |
|---|---|---|---|
| 6,067,078 A | 5/2000 | Hartman | |
| 6,668,221 B2 | 12/2003 | Harter, Jr. et al. | |
| 7,126,583 B1 | 10/2006 | Breed | |
| 8,248,543 B2 | 8/2012 | Jaworski et al. | |
| 2010/0250044 A1* | 9/2010 | Alasry | B60K 37/00 701/31.4 |
| 2013/0293452 A1 | 11/2013 | Ricci et al. | |
| 2014/0310103 A1 | 10/2014 | Ricci | |
| 2014/0344062 A1 | 11/2014 | Lamont | |
| 2014/0362195 A1* | 12/2014 | Ng-Thow-Hing | G06K 9/00791 348/51 |
| 2016/0109701 A1 | 4/2016 | Goldman-Shenhar et al. | |
| 2016/0299617 A1* | 10/2016 | Hanson | G06F 3/0416 |
| 2017/0066375 A1* | 3/2017 | Kato | H04N 7/181 |
| 2017/0090594 A1* | 3/2017 | Borghi | G06F 3/03549 |
| 2018/0059913 A1* | 3/2018 | Penilla | B60N 2/0228 |

FOREIGN PATENT DOCUMENTS

| | | | |
|---|---|---|---|
| CN | 103921744 A | * | 7/2014 |
| GB | 2517961 B | | 12/2017 |

\* cited by examiner

SYSTEMS AND METHODS FOR CONTROL OF VEHICLE FUNCTIONS VIA DRIVER AND PASSENGER HUDS

TECHNICAL FIELD

The present disclosure generally relates to control of various vehicle functions via driver and passenger heads-up displays (HUDs) and, more specifically, methods and systems sharing and transferring control of the vehicle functions between the driver HUD and the passenger HUD.

BACKGROUND

Some modern vehicles include HUDs viewable by the driver that can display information such as the speed limit, current speed, and more. These HUDs may be placed in front of the driver in line with his or her view of the road. Safety regulations in some regions prohibit displaying certain information to the driver, such as video and other distracting content, while the vehicle is in motion. Regulations may also prohibit the driver from carrying out some vehicle functions under certain circumstances, so as to prevent the driver from being distracted.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for controlling one or more vehicle functions via a driver HUD and a passenger HUD. An example disclosed vehicle includes a driver HUD, a passenger HUD, and a processor. The processor is configured for enabling control of one or more vehicle functions via the driver HUD responsive to determining that the vehicle speed is below a threshold, and transitioning control of the one or more vehicle functions from the driver HUD to the passenger HUD responsive to determining that the vehicle speed has increased above the threshold.

An example method includes enabling control of one or more vehicle functions via a driver HUD responsive to determining that a vehicle speed is below a threshold. The method also includes transitioning control of the one or more vehicle functions from the driver HUD to a passenger HUD responsive to determining that the vehicle speed has increased above the threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, some modern vehicle may include a HUD that can provide information to the driver and/or passengers of the vehicle. This display of information, however, may be limited by safety regulations which dictate under which circumstances various information can be displayed within view of a driver (i.e., on a driver HUD or center stack display), as well as dictate which functions are available for use during movement of the vehicle. For instance, some vehicles may prohibit certain actions unless the vehicle is in reverse, travelling below a certain speed, or in park, in order to prevent unnecessary distractions.

While in many cases safety concerns result in the driver being prohibited from viewing certain information and interacting with the vehicle in certain ways, other passengers in the vehicle may not be similarly prohibited. A passenger of the vehicle may still be allowed to view information and interact with the vehicle without any concern for safety.

With these issues in mind, example embodiments of the present disclosure may enable a passenger of the vehicle to control various vehicle functions while the vehicle is in motion that would ordinarily be prohibited due to the movement of the vehicle and potential for driver distraction. To that end, various embodiments may include the use of a driver HUD as well as a passenger HUD, either or both of which can be interacted with to control one or more vehicle function under specific circumstances. Embodiments may also include the ability for a passenger to share information with the driver (via display on the driver HUD), as well as one or more safety measures to ensure that the driver remains undistracted even though the passenger is able to control vehicle functions and view information that the driver is prohibited from viewing.

In one example, the vehicle may enable various vehicle functions while the vehicle is in park, or is below a threshold speed. These functions may include, for example, entering and modifying route or guidance information, managing incoming and outgoing communication with a remote device (e.g., smartphone) paired to the vehicle, managing BLUETOOTH connections, managing a rear seat entertainment system, viewing images captured by external vehicle cameras, and more. The driver may be permitted access to these vehicle functions when the vehicle speed is below the threshold.

However, when the vehicle speed increases and the vehicle begins moving faster than the threshold speed, control may be disabled for the driver, and enabled for the passenger. In this way, the passenger is free to control vehicle functions, and the driver is less likely to be distracted. Further, the vehicle remains in compliance with the safety regulations, while still allowing passengers in the vehicle to manage route and guidance information, BLUETOOTH connections, the rear entertainment system, and more.

Figure 1:
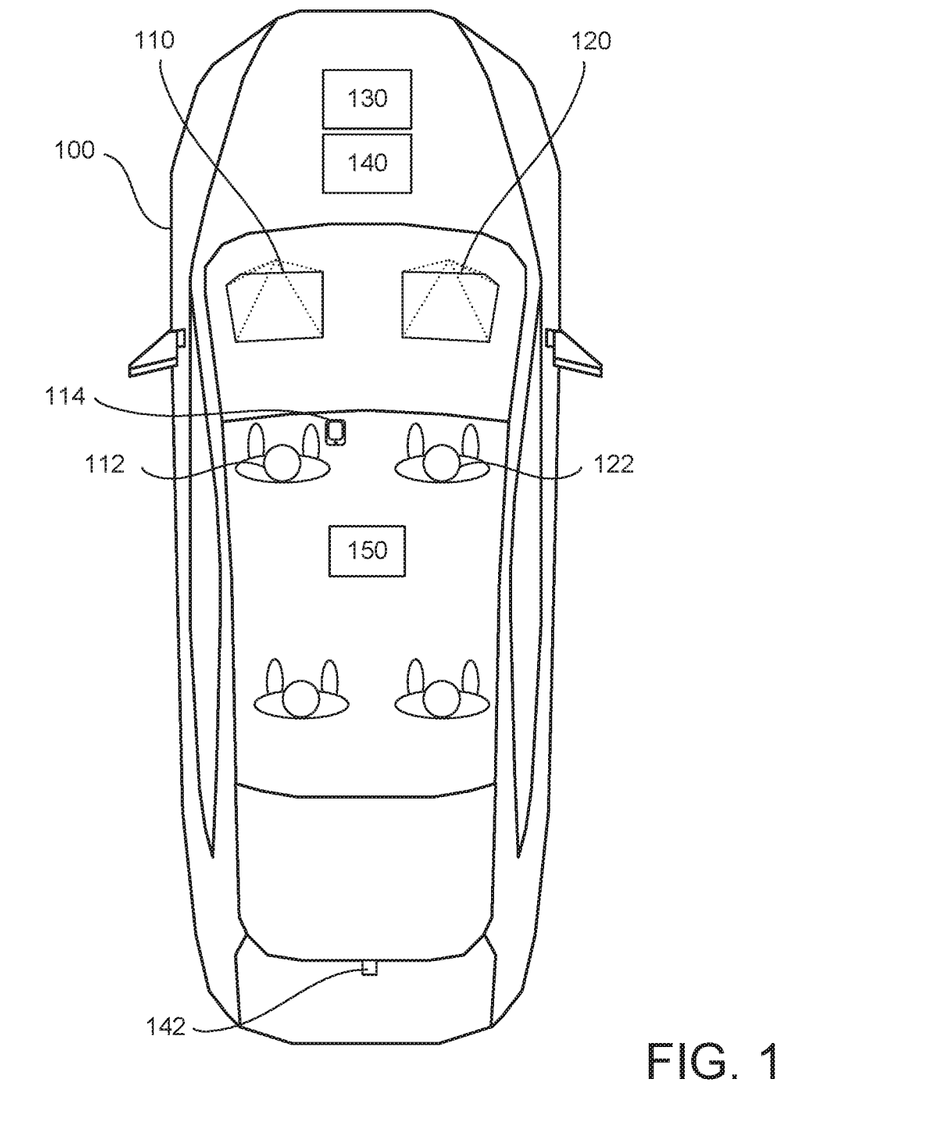
FIG. 1 illustrates an example vehicle according to embodiments of the present disclosure.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

Vehicle 100 may include a driver HUD 110, a passenger HUD 120, a processor 130, one or more sensors 140, and a rear entertainment system 150, along with one or more other components or systems that may or may not be shown in FIG. 1.

As used herein, a "heads-up display" and a "HUD" refer to a system that projects an image onto a transparent surface to create a transparent interface within a field of view of a user. For example, a heads-up display of a vehicle projects an image onto a transparent surface of a vehicle through which an occupant looks (e.g., a windshield) to create a transparent interface within a typical field of view of the occupant (e.g., through the windshield).

Driver HUD 110 and passenger HUD 120 may each include a projector and a transparent surface within a field-of-view of a respective user (i.e., the driver 112 or the passenger 122) in front of the transparent surface. In some examples, the transparent surface is the windshield through which the user 112 looks during operation of the vehicle 100. In other examples, the transparent surface is located on top of a dashboard and in front of the windshield such that the transparent surface is located within the field-of-view of the user during operation of the vehicle 100.

As illustrated in FIG. 1, driver HUD 110 and/or passenger HUD 120 may include a projector that emits a projection onto a portion of the transparent surface that intersects with the field-of-view of the user(s) 112 and/or 122. The projector emits the projection onto the transparent surface to create a virtual interface for the user.

Each of the HUDs 110 and 120 may display various information, and may be used by the driver 112 and passenger 122 to interact with and control various vehicle features. As such, HUDs 110 and 120 may include user interfaces through which the driver 112 and passenger 122 may interact. In this disclosure, reference may be made to a single HUD, however it should be understood that the features and components described with respect to an example HUD may apply to both the driver HUD and the passenger HUD disclosed herein.

In some examples, the user interface of a HUD may include one or more cameras, ultrasonic sensors, radar and the like to detect occupant gestures. For example, the cameras may be configured to capture images of the user of the HUD, in order to detect one or more gestures. The gestures may be used as control inputs, which may cause the processor 130 to responsively carry out one or more actions. The gestures can include selecting yes or no, selecting one or more predetermined actions (e.g., answer call, deny call, etc.), selecting one or more icons or menu options, zooming in and out of a map, drawing text or other characters, and more.

In some examples, the HUD may display an interface including one or more options on the transparent surface. The camera may enable the processor to detect when a user has made a selection on the transparent surface, by detecting the selection of one or more buttons, options, or other icons displayed by the HUD. This can be done, for example, by detecting the location of a user's hand or finger(s) with respect to the displayed interface.

In some examples, the user may control the HUD via a smartphone or other computing device coupled to the vehicle (e.g., device 114). The computing device may include a smartphone, tablet, or other handheld device that is communicatively coupled to the vehicle, such as via a BLUETOOTH, Wi-Fi, or other wireless or wired connection. The user may interact with the phone by selecting one or more buttons, options, or other icons such that the input is reflected on the HUD. The HUD may then change what is displayed in response to the selections by the user on the computing device.

In some examples, vehicle 100 may include one or more control pads, buttons, joysticks, knobs, or other input devices that can be interacted with by the driver 112 and/or passenger 122. These input devices may be positioned in the vehicle on respective sides of the vehicle, such that there is a first set within reach of the driver (e.g., on the driver's side door), and a second set within reach of the passenger (e.g., on the passenger's side door). Each set may be within exclusive reach of one user, such that the driver cannot access the passenger's side set. Further, in some examples there may be a center control stack on a center console of the vehicle that may include one or more buttons, control pads, joysticks, knobs, or other input devices that may correspond to either or both of the driver HUD 110 and the passenger HUD 120.

In some examples, the vehicle may include one or more microphones configured to capture audio from the driver 112 and/or passenger 122. The audio may include spoken commands, which may be analyzed though a speech recognition system, and ultimately used as input to control one or more of the driver HUD and passenger HUD. The audio may also be analyzed to determine whether the driver is providing excessive "coaching" of the passenger while the driver is prohibited from controlling various vehicle features (e.g., while the vehicle is moving above a threshold speed) which will be discussed in further detail below.

Sensors 140 may include, for example, one or more external cameras (e.g., front facing, rear facing 142, side facing, and more), internal cameras 148 (e.g., for gesture tracking, button selection detection, seat occupancy detection, etc.), one or more seat sensors 144 to detect the presence of a person in the vehicle seats, one or more microphones 146, a speed sensor 149, and more.

Processor 130 of vehicle 100 may be configured to carry out one or more actions or functions such as those described in herein. In some examples, the processor 130 may be configured for enabling control of one or more vehicle functions via the driver HUD 110 responsive to determining that the vehicle speed is below a threshold.

As noted above, the vehicle functions may include, for example, entering and modifying route or guidance information, managing incoming and outgoing communication with a remote device (e.g., smartphone) paired to the vehicle, managing BLUETOOTH connections, managing a rear seat entertainment system, viewing images captured by external vehicle cameras, and more. The processor 130 may be configured to enable control of these functions via the driver HUD 110 responsive to determining that the vehicle speed is below the threshold. Enabling control via the driver HUD 110 may include enabling one or more of the input mechanisms described above (e.g., gesture tracking or detection, phone input, buttons, etc.) to be used to interact with the vehicle and control the various features.

In some examples, the threshold speed may be as low as 5 mph or less (e.g., 0 mph). In other examples, the threshold may be greater than 5 mph. It should be understood that this number is for example only, and that any threshold speed may be used.

In some examples, the processor 130 may also enable control via the passenger HUD 120 when the vehicle is travelling below the threshold speed. However, in other examples, in addition to enabling control of the vehicle functions via the driver HUD 110, the processor 130 may also be configured to disable control of a subset or all vehicle functions via the passenger HUD 120 responsive to determining that the vehicle is travelling below the threshold speed. This may prevent both the driver and the passenger from both having control of the same functions at the same time.

The processor 130 may further be configured to enable or disable controls of the vehicle functions via the passenger HUD 120 responsive to determining that the vehicle has transitioned from travelling above the threshold speed to travelling below the threshold speed, or vice versa.

Processor 130 may also be configured to transition control of the one or more vehicle functions from the driver HUD 110 to the passenger HUD 120 responsive to determining that the vehicle speed has increased above the threshold. In practice, this may include first determining that the vehicle speed has increased from a value below the threshold to a value above the threshold (e.g., rather than simply that the vehicle speed is greater than the threshold).

Transitioning control from the driver HUD 110 to the passenger HUD 120 may include the processor 130 switching from receiving inputs corresponding to the driver HUD 110 to receiving inputs corresponding to the passenger HUD 120. As such, in effect the driver is no longer allowed to control the vehicle functions, but instead the passenger has control.

In some examples, transitioning control of the one or more vehicle functions can include disabling control of the one or more vehicle functions via the drive HUD 110, and enabling control of the one or more vehicle functions via the passenger HUD 120.

As noted above, the vehicle functions can include vehicle route and guidance. In some examples, the driver may be prevented from managing (e.g., entering, modifying route information) while the vehicle is in motion. As such, the processor 130 may be configured to receive vehicle route information while the vehicle is travelling at greater than the threshold speed. The input route information may be input via the passenger HUD 120. For instance, while the vehicle is moving, the driver and/or passenger may decide to change where they are headed. The passenger may input route information via the passenger HUD 120, and select an option to update the driver HUD 110 display to include the updated information. The processor 130 may then display, via the driver HUD 110, a vehicle route determined based on the information received via the passenger HUD 120.

In some examples, passenger 122 may interact with the passenger HUD 120 to create a draft driving route by changing or adding a destination to the active route in the vehicle navigation system while the driver 112 still sees and hears the active route via the driver HUD 110. The passenger 122 may then send the draft route to the driver HUD 110 for the driver to accept or reject. This draft route may be sent by selecting a menu option, pressing a button, providing a gesture such as a sweeping motion in the direction of the driver and the like.

The one or more vehicle functions may include managing communication received by a remote device communicatively coupled to the vehicle. For instance, a smartphone 114 corresponding to the driver 112 that is paired to vehicle 100 via a BLUETOOTH connection.

In this case, the processor 130 may be configured to display incoming messages, emails, and more via the driver HUD 110 when it is determined that the vehicle is travelling below the threshold speed.

When a communication is received while the vehicle is travelling above the threshold speed, processor 130 may be configured to display an alert via the driver HUD 110 indicating that a communication has been received by the remote device. The driver may then be invited to provide an input to send the communication to the passenger HUD 120 for the passenger to draft and send a response. For instance, the driver may provide a gesture (swipe right toward the passenger), or otherwise select to send the communication to the passenger HUD 120 or not.

In some examples, there may be a second vehicle or source that provides a navigation route or other information to vehicle 100. This may be from a second vehicle travelling with vehicle 100 in a convoy. This external information may be transmitted to vehicle 100 from a secondary vehicle, and/or a computing device corresponding to the secondary vehicle such as a smartphone, tablet, or other device of a user in the secondary vehicle. This information may be transmitted to vehicle 100 via BLUETOOTH, Wi-Fi, LTE Direct, or using any other wireless communication protocol.

The processor 130 may determine that the driver 112 has input a gesture (or other input), and responsively display the received communication via the passenger HUD 120. The passenger may then view the communication, draft a response, and send the response. The processor 130 may detect this input corresponding to the received communication via the passenger HUD 120.

In some examples, the vehicle functions may include managing one or more BLUETOOTH connections between the vehicle and one or more remote computing devices (such as device 114). Under ordinary circumstances, the driver may be prohibited from syncing new devices, managing synced devices, or otherwise interacting with the BLUETOOTH settings of the vehicle while in motion. Embodiments of the present disclosure may include enabling the control of these features of the vehicle via the passenger HUD 120, rather than the driver HUD 110 or center console of the vehicle, while in motion. This prevents the driver from being unnecessarily distracted.

In some examples, the vehicle functions may include managing a rear seat entertainment system 150. While the vehicle is in motion, the processor 130 may enable control of the rear entertainment system 150 via the passenger HUD 120. This can allow the passenger 122 to control the rear entertainment system without causing a distraction for the driver 112.

As noted above, vehicle 100 may include one or more internal or external cameras. The external cameras may provide information that can be used during back up and ordinary use of the vehicle to avoid collisions. In some examples, the vehicle functions may include managing the display of images captured by the external and/or internal cameras. For examples, the passenger 122 may be able to view live images from the cameras (such as camera 142) while the vehicle is travelling above the threshold speed.

The processor 130 may display one or more images captured by the cameras on the passenger HUD 120, allowing the passenger 122 to view the live images. The passenger 122 may then provide input to the processor via the passenger HUD 120, indicating a command to display the images via the driver HUD 110. The driver HUD 110 may then display the images. This series of events may assist the driver in performing a lane change or parking maneuvers, by allowing the passenger 122 to determine when to pass the live images on to the driver HUD 110.

In some examples, the driver 112 may have the option to disable the transition of control from the driver HUD 110 to the passenger HUD 120. The driver may have a corresponding profile stored by the vehicle, or may otherwise input a command indicating that control should not be transferred to the passenger HUD 120. The processor 130 may receive this input, and responsively prevent the transition of control of the one or more vehicle functions from the driver HUD 110 to the passenger HUD 120.

In some examples, the vehicle 100, processor 130, and/or one or more other vehicle system may have one or more features that prevent the driver 112 from controlling the vehicle functions while the vehicle is travelling above the threshold speed. For instance, the passenger HUD 120 may be configured such that it is not visible from the driver seat of the vehicle. Further, where a remote computing device is used for input to the passenger HUD 120 (e.g., a smartphone), the vehicle may be configured to localize the device to ensure that it is not being used by the driver. The processor may only allow commands from the device to be carried out upon detecting that the device is located in or proximate the passenger seat. In some examples, the vehicle may be configured to only allow input from the passenger side controls (e.g., buttons, track pad, etc.), and may ignore input from the driver's side when the vehicle is travelling above the threshold speed.

In some examples, one or more internal cameras, ultrasonic sensors, or other sensors may be used for gesture tracking, to ensure that the driver is not inputting commands to the passenger HUD. The gesture location may be determined, such that only gestures provided by the passenger are allowed.

In some examples, the vehicle 100 may include a seat sensor 144 that infers that a person is likely present in the vehicle seats, particularly the passenger seat. If the passenger seat is unoccupied, control may not transition from the driver HUD 110 to the passenger HUD 120. Or in some cases, the processor may be configured to transition control of the one or more vehicle functions from the driver HUD 110 to the passenger HUD 120 responsive to determining both that the vehicle speed has increased above the threshold, and determining that a passenger is present in the passenger seat. In some examples the seat sensor may include one or more cameras, ultrasonic sensors, or other sensors.

Still further, in some examples the processor may be configured to detect when the driver is performing excessive coaching of the passenger. This can be done via one or more microphones in the vehicle. Audio input to the microphones may be localized to determine whether the driver 112 is providing too much assistance to the passenger, such that the driver may be distracted. If excessive coaching is detected (e.g., via detection of certain key words or words that match corresponding commands that have just been executed), the processor 130 may provide a warning to the driver to stop due to the increased safety concerns from the distraction, or the system may suspend use of the Passenger HUD for those functions until the next key cycle.

When the vehicle is travelling above the threshold speed and control via the passenger HUD 120 is enable, the processor 130 may be configured to receive an input via the driver HUD 110, and ignore the input. This may prevent the driver from controlling the vehicle functions when he or she is prohibited from doing so.

The examples disclosed herein may include various functions or actions occurring responsive to determining that the vehicle speed is greater than or less than a given threshold speed. However, it should be noted that some embodiments may instead include carrying out the same functions or actions responsive to determining that the vehicle is in a particular gear, such as park, reverse, or drive. For instance, the processor may be configured to enable control of the vehicle functions via the driver HUD 110 while the vehicle is in park. And when the vehicle changes gears into reverse or drive, the processor may transition control from the driver HUD 110 to the passenger HUD 120.

Figure 2:
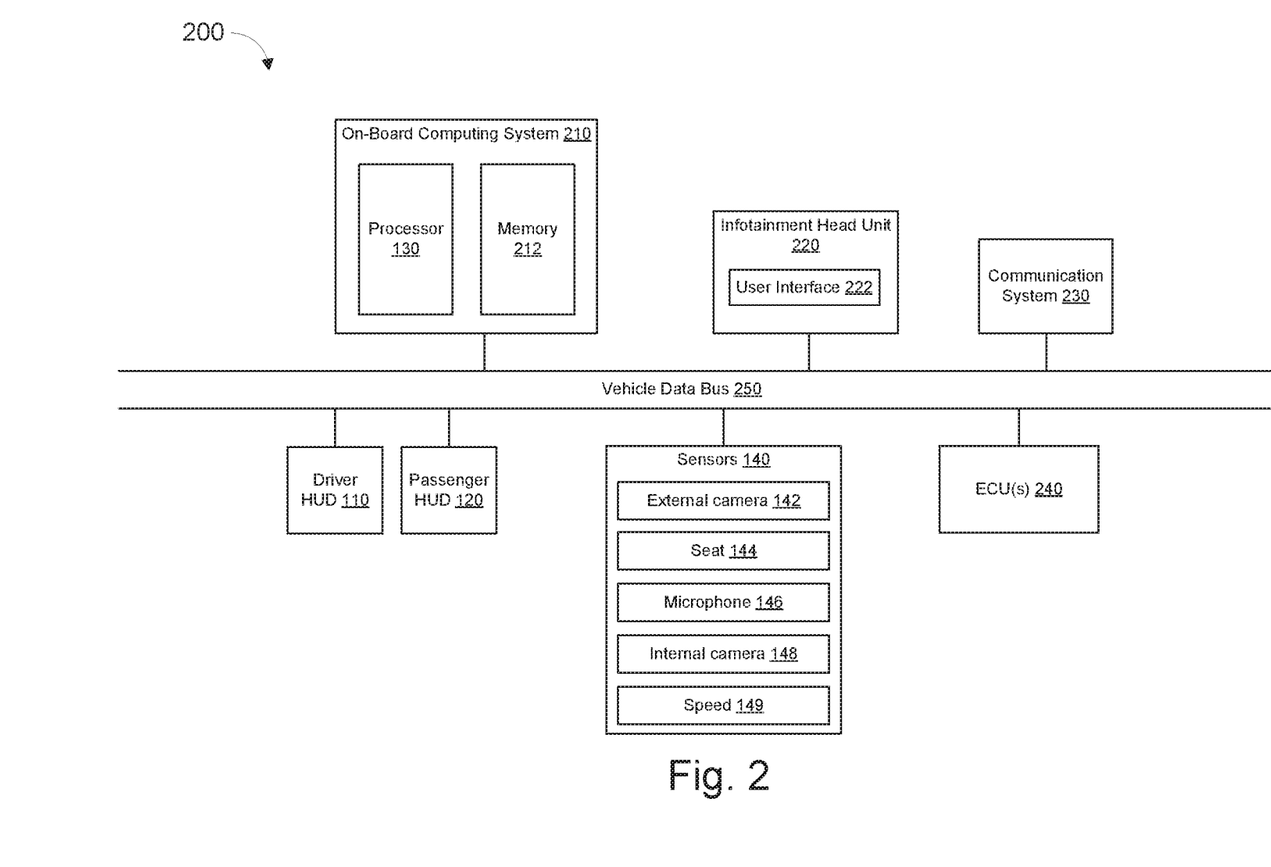
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, communication system 230, driver HUD 110, passenger HUD 120, sensors 140, electronic control unit(s) 240, and vehicle data bus 250.

The on-board computing system 210 may include a microcontroller unit, controller or processor 130 and memory 212. Processor 130 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 130 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display and user interface 222. User interface 222 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a display of vehicle 100.

Communication system 230 may include one or more antennas, processors, modules, and other electronic components configured to facilitate communication between the processor 130 and one or more other devices or systems. This can include, for example, device 114 and one or more other computing devices that are coupled to the vehicle via a BLUETOOTH connection. As such, communication system may be configured to operate using various communication protocols.

Sensors 140 may be arranged in and around the vehicle 100 in any suitable fashion. In the illustrated example, sensors 140 include one or more cameras 142 and 148, one or more seat sensors 144 for detecting whether one or more vehicle seats are occupied, one or more microphones 146, and a speed sensor 149. Other sensors may be included as well.

The ECUs 240 may monitor and control subsystems of vehicle 100. ECUs 240 may communicate and exchange information via vehicle data bus 250. Additionally, ECUs 240 may communicate properties (such as, status of the ECU 240, sensor readings, control state, error and diagnostic codes, etc.) to and/or receive requests from other ECUs 240. Some vehicles 100 may have seventy or more ECUs 240 located in various locations around the vehicle 100 communicatively coupled by vehicle data bus 250. ECUs 240 may be discrete sets of electronics that include their own circuit(s) (such as integrated circuits, microprocessors, memory, storage, etc.) and firmware, sensors, actuators, and/or mounting hardware.

Vehicle data bus 250 may include one or more data buses that communicatively couple the on-board computing system 210, infotainment head unit 220, communication system 230, sensors HUDs 110 and 120, Sensors 140, ECUs 240, and other devices or systems connected to the vehicle data bus 250. In some examples, vehicle data bus 250 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7). In some examples, the CAN bus may be shared with the CAN-FD bus.

Figure 3:
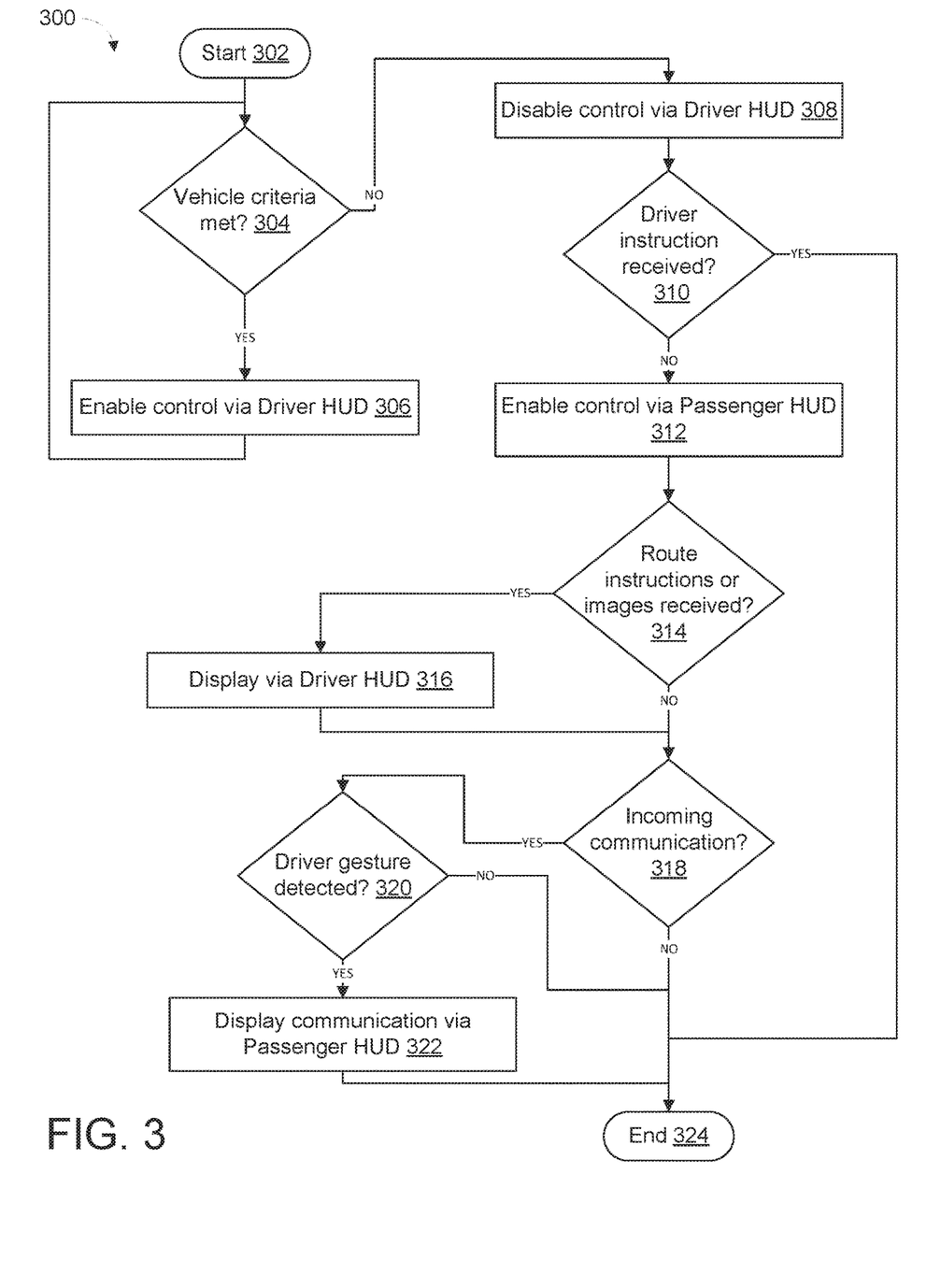
FIG. 3 illustrates a flowchart of an example method according to embodiments of the present disclosure.

FIG. 3 illustrates an example method 300 according to embodiments of the present disclosure. Method 300 may enable a vehicle to transition control of one or more vehicle functions from a driver HUD 110 to a passenger HUD 120. The flowchart of FIG. 3 is representative of machine readable instructions that are stored in memory and may include one or more programs which, when executed by a processor may cause vehicle 100 and/or one or more systems or devices described herein to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include determining whether one or more vehicle criteria are met, such as whether the vehicle speed is less than a threshold, whether the vehicle is in park, neutral, or another gear, whether the vehicle is moving or stationary, and/or whether some other vehicle criteria is met. Regarding the vehicle speed threshold, the threshold may be as low as 5 mph or less, even 0 mph. If the criteria is met (e.g., the speed is less than this threshold), method 300 may include enabling control of one or more vehicle functions via the driver HUD at block 306. The vehicle functions may be any of those describe herein, including managing BLUETOOTH connections, route and guidance data, live camera feeds, communications, and more.

If the vehicle criteria is not met (e.g., the speed is greater than the threshold), method 300 may include disabling control of the vehicle functions via the driver HUD at block 308.

At block 310, method 300 may include determining whether a driver instruction has been received indicating that control of the vehicle functions should not be transferred to the passenger HUD. This may be the case where the passenger is a child, is unfamiliar with the car, or in any situation where the driver does not wish to allow the passenger to control the vehicle functions while the vehicle is in motion. This instruction not to transfer control may be set anytime the vehicle is in park, is not moving, or where the driver otherwise has total control (i.e., when the driver is not prohibited from carrying out one or more actions).

If an instruction to prevent the transfer of control from the driver HUD to the passenger HUD was received, method 300 may end at block 324. However, if no such instruction was received, method 300 may proceed to block 312. At block 312, method 300 may include enabling control of the vehicle functions via the passenger HUD.

At block 314, method 300 may include determining whether route instructions or images from one or more vehicle cameras have been received. The route instructions may be input via the passenger HUD (and/or received from a computing device), and may include different instructions than a route currently presented to the driver via the driver HUD. While the current route is being presented to the driver, the vehicle may determine a new route based on the input route information. The vehicle may then display the new route to the driver via the driver HUD at block 316. Further, if one or more images are received from vehicle cameras at block 314, the passenger may determine that the images should be displayed to the driver. The passenger may select to display the images at block 316.

At block 318, method 300 may include determining whether an incoming communication has been received by a device coupled to the vehicle (e.g., BLUETOOTH pairing). If a communication has been received, the driver may provide an input (e.g., a gesture) via the driver HUD indicating that the communication should be displayed and dealt with by the passenger. If an input gesture was detected at block 320, method 300 may include displaying the communication via the passenger HUD at block 322. This can allow the passenger to read the communication, draft an appropriate response, and send the response. Method 300 may then end at block 324.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a driver HUD;
   a passenger HUD; and
   a processor configured for:
      enabling control of one or more vehicle functions via the driver HUD responsive to determining that the vehicle speed is below a threshold, wherein the one or more vehicle functions comprise managing communication received by a remote device communicatively coupled to the vehicle;
      transitioning control of the one or more vehicle functions from the driver HUD to the passenger HUD responsive to determining that the vehicle speed has increased above the threshold;
      displaying an alert via the driver HUD indicating a communication has been received by the remote device;
      determining that a gesture has been detected corresponding to a driver of the vehicle;
      responsively displaying the communication on the passenger HUD; and
      receiving input via the passenger HUD corresponding to a response to the communication.

2. The vehicle of claim 1, wherein transitioning control of the one or more vehicle functions comprises:
   disabling control of the one or more vehicle functions via the driver HUD; and
   enabling control of the one or more vehicle functions via the passenger HUD.

3. The vehicle of claim 1, wherein the processor is further configured for disabling control of the one or more vehicle functions via the passenger HUD responsive to determining that the vehicle speed is below the threshold.

4. The vehicle of claim 1, wherein the one or more vehicle functions comprise vehicle route determination.

5. The vehicle of claim 4, wherein the processor is further configured for:
   receiving vehicle route information via the passenger HUD while the vehicle speed is above the threshold; and
   displaying, via the driver HUD, a vehicle route determined based on the received vehicle route information.

6. The vehicle of claim 4, wherein the processor is further configured for:
   receiving vehicle route information from a computing device external to the vehicle while the vehicle speed is above the threshold; and
   displaying, via the driver HUD, a vehicle route determined based on the received vehicle route information.

7. The vehicle of claim 1, wherein the one or more vehicle functions comprise managing one or more wireless short-range communication connections between the vehicle and one or more remote computing devices.

8. The vehicle of claim 1, further comprising a rear seat entertainment system, wherein the one or more vehicle functions comprise managing the rear seat entertainment system.

9. The vehicle of claim 1, further comprising one or more cameras, wherein the one or more vehicle functions comprises controlling a display of images captured by the one or more cameras.

10. The vehicle of claim 9, wherein the processor is further configured for:
    displaying the images captured by the one or more cameras via the passenger HUD;
    receiving input via the passenger HUD corresponding to the images; and
    displaying the images via the driver HUD.

11. The vehicle of claim 1, wherein the processor is further configured for:
    receiving, via the driver HUD, an input indicating control should not be transferred to the passenger HUD; and
    responsively preventing a transition of control of the one or more vehicle functions from the driver HUD to the passenger HUD.

12. The vehicle of claim 1, wherein the processor is further configured for:
    determining, while the vehicle speed is above the threshold, that an input to the passenger HUD was provided by a driver of the vehicle; and
    responsively ignoring the input.

13. The vehicle of claim 1, further comprising a passenger seat occupancy sensor, wherein the processor is further configured for:
    determining, via the passenger seat occupancy sensor, that a passenger is present; and
    transitioning control of the one or more vehicle functions from the driver HUD to the passenger HUD responsive to determining that (i) the vehicle speed has increased above the threshold and (ii) that the passenger is present.

14. A method comprising:
    enabling control of one or more vehicle functions via a driver HUD responsive to determining that a vehicle speed is below a threshold wherein the one or more vehicle functions comprise managing communication received by a remote device communicatively coupled to the vehicle;

transitioning control of the one or more vehicle functions from the driver HUD to a passenger HUD responsive to determining that the vehicle speed has increased above the threshold;

displaying an alert via the driver HUD indicating a communication has been received by the remote device;

determining that a gesture has been detected corresponding to a driver of the vehicle;

responsively displaying the communication on the passenger HUD; and receiving input via the passenger HUD corresponding to a response to the communication.

15. The method of claim 14, wherein transitioning control of the one or more vehicle functions comprises:

disabling control of the one or more vehicle functions via the driver HUD; and enabling control of the one or more vehicle functions via the passenger HUD.

16. The method of claim 14, wherein the one or more vehicle functions comprise vehicle route determination, the method further comprising:

receiving vehicle route information via the passenger HUD while the vehicle speed is above the threshold; and displaying, via the driver HUD, a vehicle route determined based on the received vehicle route information.

17. The method of claim 14, wherein the one or more vehicle functions comprise managing one or more wireless short-range communication connections between the vehicle and one or more remote computing devices.

18. The method of claim 14, wherein the one or more vehicle functions comprise managing a rear seat entertainment system.

* * * * *